US012256812B1

(12) United States Patent
Crews et al.

(10) Patent No.: US 12,256,812 B1
(45) Date of Patent: Mar. 25, 2025

(54) WATCH BAND FOR A SMART WATCH

(71) Applicant: Apple Inc., Cupertino, CA (US)

(72) Inventors: Kathryn P. Crews, Menlo Park, CA (US); Peter F. Coxeter, Sunnyvale, CA (US); Yiwei Tao, Cupertino, CA (US); Shantanu R. Ranade, Mountain View, CA (US); Christopher I. Edwards, Odenton, MD (US); David M. Kindlon, Felton, CA (US); Linda D. Benavente-Notaro, Sherman Oaks, CA (US)

(73) Assignee: Apple Inc., Cupertino, CA (US)

( * ) Notice: Subject to any disclaimer, the term of this patent is extended or adjusted under 35 U.S.C. 154(b) by 698 days.

(21) Appl. No.: 17/481,167

(22) Filed: Sep. 21, 2021

Related U.S. Application Data

(60) Provisional application No. 63/127,954, filed on Dec. 18, 2020.

(51) Int. Cl.
*A44C 5/14* (2006.01)
*G04B 37/14* (2006.01)

(52) U.S. Cl.
CPC ............ *A44C 5/14* (2013.01); *G04B 37/1486* (2013.01)

(58) Field of Classification Search
CPC ................................................. G04B 37/1486
USPC ................................................. 224/164–179
See application file for complete search history.

(56) References Cited

U.S. PATENT DOCUMENTS

| | | | | |
|---|---|---|---|---|
| 7,120,936 | B2 | 10/2006 | DeSantis | |
| 9,521,885 | B2 * | 12/2016 | Weber | G02B 6/0001 |
| 9,894,789 | B1 * | 2/2018 | Hamada | B32B 37/18 |
| 10,156,029 | B1 * | 12/2018 | Podhajny | A41D 1/005 |
| 10,485,103 | B1 * | 11/2019 | Sunshine | H01L 23/49838 |
| 2010/0208445 | A1 * | 8/2010 | Asvadi | H05K 1/189<br>442/206 |
| 2015/0177436 | A1 * | 6/2015 | Zimmermann | D03D 15/547<br>362/583 |
| 2017/0370030 | A1 * | 12/2017 | Podhajny | G06F 3/0446 |
| 2018/0038022 | A1 * | 2/2018 | Podhajny | D03D 15/67 |
| 2018/0195210 | A1 * | 7/2018 | Sunshine | D03D 1/0088 |
| 2018/0363172 | A1 * | 12/2018 | Keating | D04B 1/16 |
| 2019/0013274 | A1 * | 1/2019 | Sunshine | H01L 23/5386 |
| 2019/0013275 | A1 * | 1/2019 | Sunshine | H01L 23/5387 |

FOREIGN PATENT DOCUMENTS

| | | |
|---|---|---|
| CN | 104643310 | 5/2015 |
| JP | 2017-197893 | 11/2017 |

* cited by examiner

*Primary Examiner* — Scott T McNurlen
(74) *Attorney, Agent, or Firm* — BAKERHOSTETLER

(57) ABSTRACT

A watch band for a smart watch can secure the smart watch to the user's wrist. The watch band can include a continuous loop of woven material to conform around the user's wrist. The watch band can further include an encasement formed from a rigid material to receive the smart watch. The encasement can protect the smart watch during activities. The watch band can include a retention portion formed from a transparent material to receive the smart watch. The watch band can also include light emitted diodes to increase visibility.

20 Claims, 6 Drawing Sheets

WATCH BAND FOR A SMART WATCH

CROSS-REFERENCE TO RELATED APPLICATION

This application claims the benefit of U.S. Provisional Application No. 63/127,954, entitled "WATCH BAND FOR A SMART WATCH," filed Dec. 18, 2020, the entirety of which is incorporated herein by reference.

TECHNICAL FIELD

The present description relates generally to watch bands, and, more particularly, to watch bands for smart watches.

BACKGROUND

Portable electronic devices have become increasingly popular, and the features and functionality provided by portable electronic devices continue to expand to meet the needs and expectations of many consumers. Some portable electronic devices, such as smart watches, provide fitness and/or health tracking capabilities. Because these devices can be used during periods of user activity, fitness and/or health metrics can be helpful to protect the health and safety of the user during the activity.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
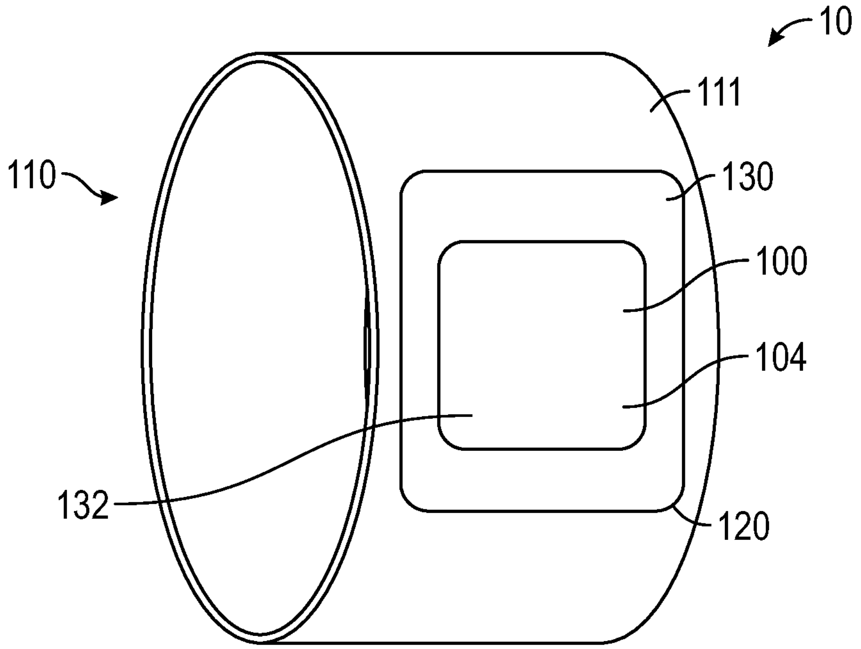
FIG. 1 illustrates a schematic view of a watch band, in accordance with some embodiments of the present disclosure.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Embodiments described herein provide a watch band for a smart watch can secure the smart watch to the user's wrist. The watch band can include a continuous loop of woven material to conform around the user's wrist. The watch band can further include an encasement formed from a rigid material to receive the smart watch. The encasement can protect the smart watch during activities. The watch band can include a retention portion formed from a transparent material to receive the smart watch. The watch band can also include light emitting diodes to increase visibility.

Some portable electronic devices, such as smart watches, provide fitness and/or health tracking capabilities. Because these devices can be used during periods of user activity, fitness and/or health metrics can be helpful to protect the health and safety of the user during the activity. Accordingly, users may wear smart watches during physical activities or sports. The smart watch may become separated from the user and/or damaged during physical activities.

The watch bands described herein can allow for a smart watch to be securely retained or coupled to the user. Further, the watch bands can include feature to protect the smart watch from impact, abrasion, and/or other damage, while permitting viewing of the display of the smart watch and/or interaction with the smart watch. Embodiments of the watch bands can allow for sensors of the smart watch to measure data from the user and/or the user's environment. In some embodiments, the construction of the watch band can wick away moisture from the user to increase user comfort.

A watch band for a smart watch can secure the smart watch to the user's wrist. The watch band can include a continuous loop of woven material to conform around the user's wrist. The watch band can further include an encasement formed from a rigid material to receive the smart watch. The encasement can protect the smart watch during activities. The watch band can include a retention portion formed from a transparent material to receive the smart watch. The watch band can also include light emitting diodes to increase visibility.

These and other embodiments are discussed below with reference to FIGS. 1-10. However, those skilled in the art will readily appreciate that the detailed description given herein with respect to these Figures is for explanatory purposes only and should not be construed as limiting.

Figure 2:
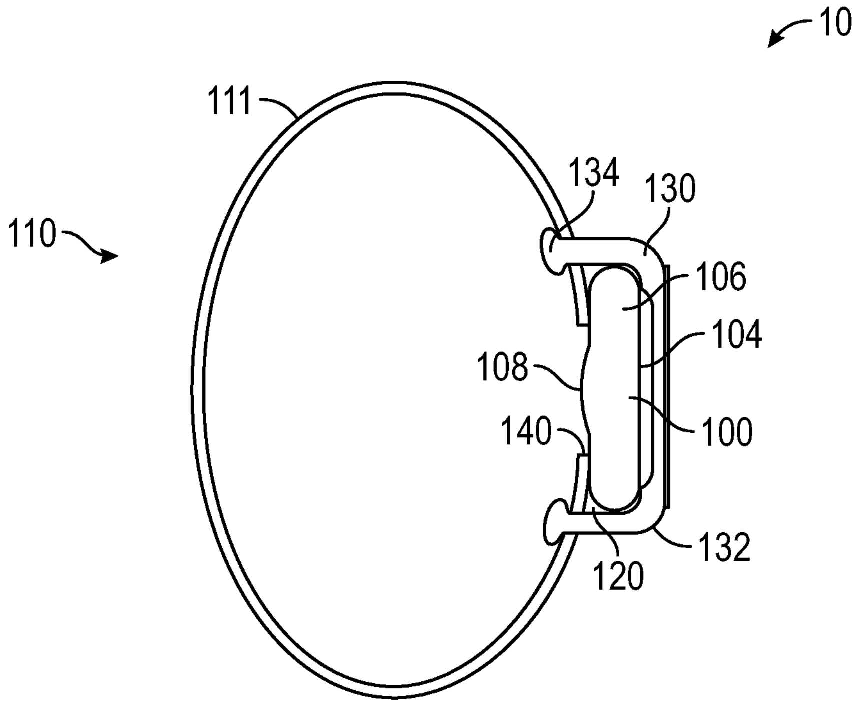
FIG. 2 illustrates a cross-sectional view of the watch band of FIG. 1.

According to some embodiments, for example as shown in FIGS. 1 and 2, a watch 10 includes a watch body 100 that is worn on a wrist with a watch band 110. In some embodiments, the watch body 100 includes a display 104 and a housing 106 for containing components. The watch body 100 can be portable and also attached to other body parts of the user or to other devices, structures, or objects.

As described herein, the watch 10 can be a "smart watch" that provides additional functionality in addition to, or instead of timekeeping functions. The smart watch 10 can be a wearable computing device that provides a local touchscreen interface through the display 104. The smart watch 10 can be capable of running an operating system, applications, and can include connectivity (WiFi/Bluetooth/GPS/cellular, etc.). The smart watch 10 can be associated with a smart phone for extended functionality. The smart watch 10 can include one or more sensors to provide fitness and/or health tracking capabilities.

In the depicted example, the watch band 110 holds, couples, or otherwise secures the watch body 100 to the user. The watch band 110 can be flexible and encircle or conform at least a portion of the wrist of a user. By securing the watch 10 to the person of the user, the watch band 110 provides security and convenience.

The watch band 110 can have a band body 111 that is continuous loop or structure that encircles the user's wrist. As illustrated, the band body 111 can encircle an entirety (e.g. 360 degrees) of the user's wrist and/or forearm. In some embodiments, the watch band 110 can be assembled as separate portions that are joined together.

The watch band 110 can be a "cuff style" band wherein width of the band body 111 is wider than the housing 106 of the watch body 100. In some applications, the watch band 110 can have similar external dimensions as a sweat band. As can be appreciated, the increased width of the band body 111 relative to the housing 106 can allow for increased user comfort, an aesthetically pleasing design, and increased capabilities or functionality, as described herein.

In the depicted example, the band body 111 can be formed, at least partially by woven, fabric threads. For example, the woven threads can form an inner layer and/or an outer layer of the band body 111. The woven threads can include warp and weft threads and/or arranged in one or more of a variety of weave patterns. Multiple layers, including opposing layers, can be interwoven together.

The woven threads of the band body 111 can be provided in an arrangement that at least partially provides gaps or interstitial spaces between the woven threads. In some embodiments, the woven structure of the band body 111 can allow the watch band 110 to resiliently stretch, extend, or otherwise expand. In some embodiments, the diameter of the watch band 110 can expand and/or contract to conform to various portions of the user and/or various users. Optionally, the band body 111 can include elastic or other stretchable materials.

Further, the woven structure of the band body 111 can allow the watch band 110 to absorb moisture. In some embodiments, moisture can be absorbed or wicked away by the fabric of the band body 111 and or the interstitial spaces between the woven threads. Advantageously, the watch band 110 can absorb moisture from the user during physical activities.

In the depicted example, the watch body 100 is coupled to or otherwise attached to the watch band 110. As illustrated, the watch band 110 defines a pocket 120 to receive or retain the watch body 100 within the watch band 110. Advantageously, the pocket 120 can allow the watch band 110 to retain the watch body 100 to the user's wrist during physical activities. Further, the pocket 120 can allow for the user to easily insert and remove the watch body 100 from the watch band 110 while allowing the watch body 100 to be retained during use. As can be appreciated, other attachment elements, such as locks, snaps, clasps, threads, and pins can be included on the watch band 110 for securely attaching to the watch body 100.

In some embodiments, the pocket 120 is defined between the band body 111 and an encasement 130 attached to the band body 111. The encasement 130 can extend radially away from the band body 111. The encasement 130 can be shaped to receive, surround, or encase at least a portion of the watch body 100. For example, the encasement 130 can be shaped to conform to, surround, or otherwise cover a portion of the display 104 and/or the housing 106 of the watch body 100.

In some embodiments, the encasement 130 can cover the edges of the display 104 and/or the housing 106 of the watch body 100. Optionally, the encasement 130 can engage with the watch body 100 with an interference fit or "snap fit" to retain the watch body 100. In some embodiments, the encasement 130 may resiliently deform to engage or conform to the watch body 100. While the encasement 130 can be shaped to accommodate the watch body 100, the encasement 130 can have a generally rectangular prism shape, square prism shape, or cuboid shape. The outer edges of the encasement 130 can be rounded.

Optionally, the encasement 130 can be formed from a rigid material such as plastic, metal, and/or glass. As can be appreciated, the encasement 130 can be formed from a harder or more rigid material than the band body 111 to allow the watch body 100 to be protected from impacts and/or abrasions while allowing the band body 111 to conform to the user's body. In some embodiments, the encasement 130 can have a higher Young's modulus than the band body 111. In other words, the encasement 130 can be formed from a material that is less flexible and/or requires more force to be bent or deformed from an original shape than the band body 111.

The encasement 130 can be coupled to an outer surface of the band body 111. The encasement 130 can be coupled to the band body 111 by an adhesive, by ultrasonic welding, or any other suitable method. Optionally, extension portions 134 of the encasement 130 can extend through the band body 111, coupling the encasement 130 to the band body 111.

As illustrated, the encasement 130 can include a display window 132 to allow the user to view and interact with the display 104 of the watch 10. In some embodiments, the display window 132 is an opening or void that allows the user to directly view, interact, or touch the display 104 of the watch 10. As can be appreciated, the display 104 can be recessed within the encasement 130 to allow the display 104 to remain protected from impacts and abrasion within the encasement 130.

In some embodiments, the display window 132 is a transparent portion of the encasement 130. The transparent portion can allow the user to view or interact with the display 104 through the display window 132. The display window 132 can be formed from glass, plastic, or any other suitable transparent material. The display window 132 can be coupled to or integrally formed with the encasement 130.

Optionally, the band body 111 can include a sensor window 140 to allow sensors 108 of the watch 10 to operate while the watch body 100 is disposed within the pocket 120 of the watch band 110. Advantageously, the sensor window 140 allows for sensors 108 to obtain data about the user and/or the user's environment while coupled to the watch band 110.

In some embodiments, the sensor window 140 is an opening or void in the band body 111 that is aligned with a sensor 108 to allow the sensor 108 to directly interact with the skin of the user. Optionally, the sensor window 140 is a transparent portion of the band body 111. The transparent portion can allow the sensor 108 to obtain optical measurements pertaining to the user. The sensor window 140 can be formed from glass, plastic, or any other material that is transparent to the sensor 108. The sensor window 140 can be coupled to or integrally formed with the band body 111.

As described herein, the watch band 110 can include one or more sensors to provide additional or supplemental functionality to the watch 10. Optionally, multiple sensors can be disposed along or within the band body 111. As illustrated, the sensors can be integrated or otherwise coupled to the band body 111.

During operation, the sensors can provide additional information or data about the user and/or the user's environment to the watch 10. The sensors may be configured to sense substantially any type of characteristic such as, but not limited to, images, pressure, light, touch, force, temperature, position, motion, and so on. For example, the sensor(s) may be a photodetector, a temperature sensor, a light or optical sensor, an atmospheric pressure sensor, a humidity sensor, a magnet, a gyroscope, an accelerometer, an ultrasonic sensor, a fluid sensor, a microphone, a contact sensor, an ambient light sensor, a touch sensor, and so on. In some embodiments, the watch band 110 can include a GPS receiver.

Figure 3:
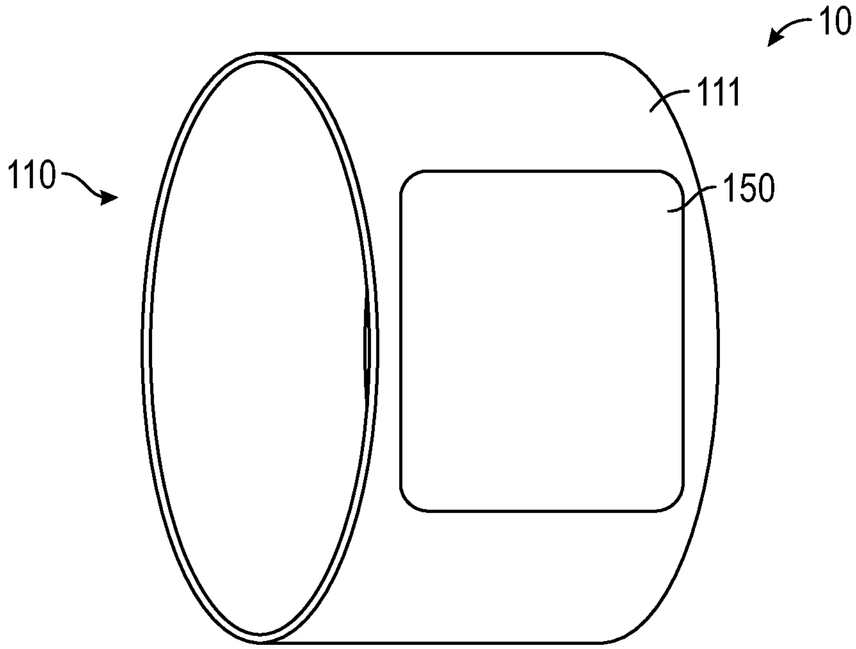
FIG. 3 illustrates a schematic view of a watch band, in accordance with some embodiments of the present disclosure.
Figure 4:
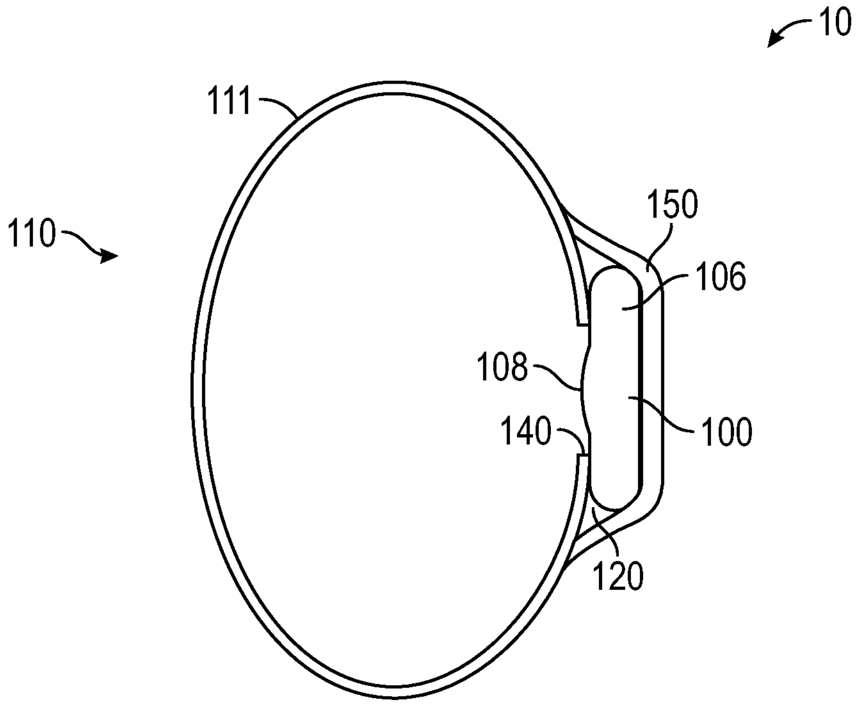
FIG. 4 illustrates a cross-sectional view of the watch band of FIG. 2.

With reference to FIGS. 3 and 4, in some embodiments, the watch band 110 can include a retention portion 150 to couple or attach the watch body 100 to the watch band 110. In the depicted example, the retention portion 150 defines the pocket 120 between the band body 111 and the retention portion 150 to receive the watch band 110.

As illustrated, the retention portion 150 is radially spaced apart from the outer surface of the band body 111. The retention portion 150 can be a strip of fabric or other conforming material that receives or encases at least a portion of the watch body 100. For example, the retention portion 150 can conform to or otherwise cover the display 104 and/or the housing 106 of the watch body 100. As illustrated, generally the entirety of the watch body 100 can be covered or otherwise surrounded by the retention portion 150 and/or the band body 111. While the retention portion 150 can be shaped to accommodate the watch body 100, the retention portion 150 may stretch or deform to conform to the watch body 100 and/or retain the watch body 100 relative to the watch band 110.

Optionally, the retention portion 150 can be formed from a conforming material such as a fabric. In some embodiments, the retention portion 150 is formed from a similar woven fabric as the band body 111. The retention portion 150 can be coupled to the outer surface of the band body 111. The retention portion 150 can be coupled to the band body 111 by weaving or knitting the retention portion 150 to the band body 111. Optionally, the retention portion 150 can be coupled to the band body 111 by other methods, such as adhesive bonding.

Optionally, a portion or all of the retention portion 150 can be formed from a transparent material to allow the user to view and interact with the display 104 of the watch 10 while retaining and protecting the watch body 100. The retention portion 150 can be formed from a monofilament mesh that permits viewing of the display 104 and allows for the user to interact with the touchscreen display 104. In some embodiments, the transparent material of the retention portion 150 can be coupled to or integrally formed with the remainder of the retention portion 150.

Figure 5:
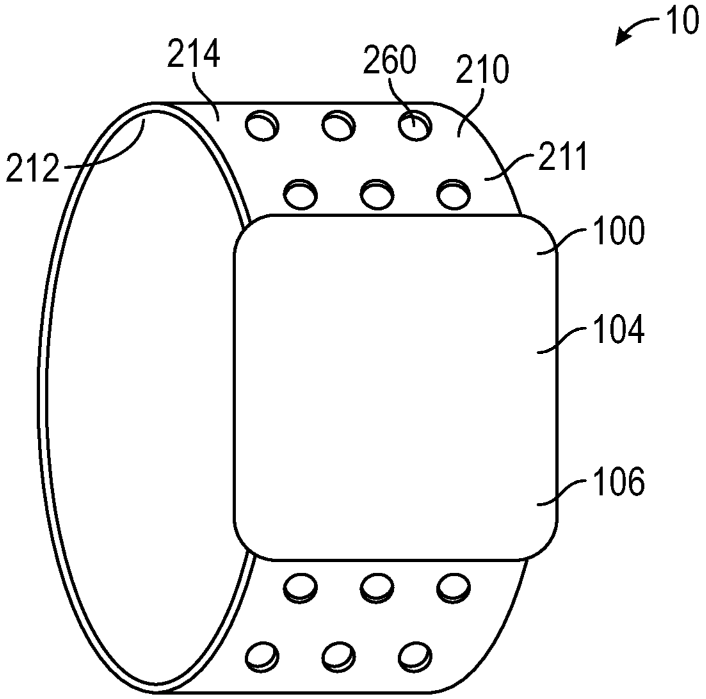
FIG. 5 illustrates a schematic view of a watch band, in accordance with some embodiments of the present disclosure.

With reference to FIG. 5, a watch band 210 can include features such as reflectors or light emitted diodes (LEDs) to increase or enhance the visibility of the user in low visibility environments, such as dark environments (e.g. outdoor nights or dimly lit/unlit spaces) and/or foggy/hazy environments. Similar to other embodiments described herein, the watch 10 includes a watch body 100 that is worn on a wrist with a watch band 210. The watch band 210 can be flexible and encircle or conform at least a portion of the wrist of a user.

The watch band 210 can have a band body 211 that is continuous structure or assembled as separate portions (e.g., straps) that join together and provide adjustable size configurations. The watch band 210 can include lugs at opposing ends of the band that fit within respective recesses or channels of the housing 106 and allow the watch band 210 to be removably attached to the housing 206. As can be appreciated, other attachment elements, such as locks, snaps, clasps, threads, and pins can be included on the watch band 210 for securely attaching to the watch body 100.

As described herein, the watch band 210 can include one or more light emitting diodes 260 to increase visibility of the user in low visibility environments. The light emitting diodes 260 can be disposed along or within the band body 211. As illustrated, the light emitting diodes 260 can be integrated or otherwise coupled to the band body 211.

In the depicted example, the light emitting diodes 260 can be embedded or coupled to the to the inner layer 212 of the band body 211. In some embodiments, the light emitting diodes 260 can be embedded or coupled to an outer layer 214 of the band body 211 or disposed between the inner layer 212 and the outer layer 214 of the band body 211. Light from the light emitting diodes 260 can be emitted through the band body 211.

As can be appreciated, the operation of the light emitting diodes 260 can be controlled by a controller disposed within the watch band 210 and/or by an external device, such as a smart phone or the watch 10. For example, the operation of the light emitting diodes 260 can be controlled by a controller disposed within the watch band 210, wherein the controller responds to inputs applied to the watch band 210 and/or sensors within the watch band 210 (e.g. ambient light sensors).

Optionally, the operation of the light emitting diodes 260 can be controlled by an external device, such as the watch 10. In some embodiments, the light emitting diodes 260 can be wirelessly connected to the watch 10 via a transmitter. The transmitter can utilize radio frequency transmissions, such as Bluetooth, Wi-Fi, ultra-wide band (UWB), or other suitable communication bands or protocols to receive commands from the watch 10. The transmitter can be disposed or otherwise enclosed between the inner layer 212 and the outer layer 214 of the band body 211. In some embodiments, the light emitting diodes 260 can be controlled by the watch 10 via a wired interface or connection. For example, the watch band 210 can include contacts or other electrical connections to interface with contacts extending from the housing 206 of the watch 10.

The light emitting diodes 260 can be powered by a battery disposed within the band body 211. In some embodiments, the light emitted diodes 260 can be powered by an external device, such as the watch 10.

Figure 6:
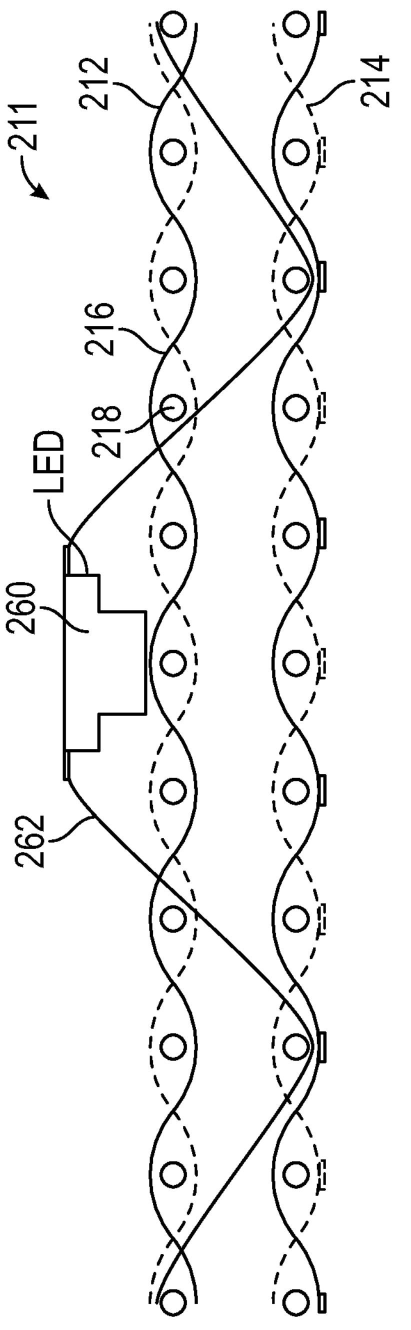
FIG. 6 illustrates a cross-sectional view of the watch band of FIG. 5, in accordance with some embodiments of the present disclosure.

With reference to FIG. 6, in some embodiments, the watch band 210 can be formed, at least partially by woven, fabric threads. For example, the woven threads can form an inner layer 212 and/or an outer layer 214. The woven threads can include warp threads 216 and weft threads 218 and/or threads arranged in one or more of a variety of weave patterns. Multiple layers, including opposing layers, can be interwoven together.

As illustrated, one or more light emitting diodes 260 can be coupled to or embedded within the inner layer 212 of the woven threads. In some embodiments, the woven threads of the band body 211 can be provided in an arrangement that at least partially exposes or emits the light from the light emitting diodes 260. For example, the woven threads can form interstitial spaces that expose the light from the light emitting diodes 260. The threads of the band body 211 can be reflective. The woven threads can further surround other components, such as a battery, controller, transmitter, etc. within the band body 211.

Optionally, flexible conductors 262 can interconnect the light emitting diodes 260. The flexible conductors 262 can be woven into the threads of the band body 211. The flexible conductors 262 can be woven in a warp direction with the warp threads 216 and/or weft direction with the weft threads 218. In some embodiments, the weave of the flexible conductors 262 can couple the light emitting diodes 260 to the band body 211. In some embodiments, the flexible conductors 262 can interconnect the light emitting diodes 260 to the battery, controller, transmitter, etc. within the band body 211.

Figure 7:
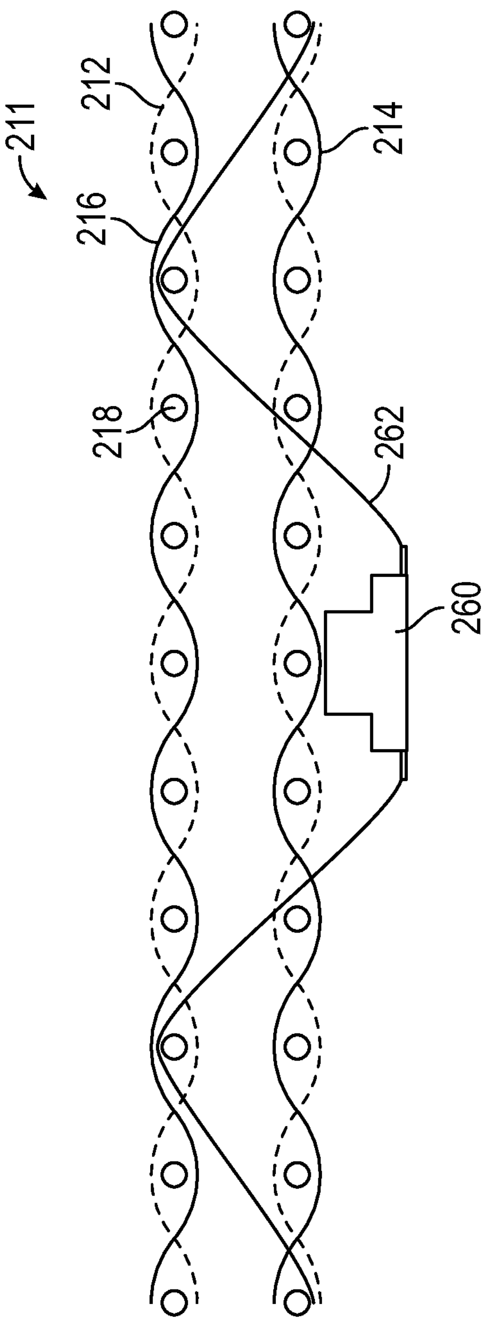
FIG. 7 illustrates a cross-sectional view of the watch band of FIG. 5, in accordance with some embodiments of the present disclosure.
Figure 8:
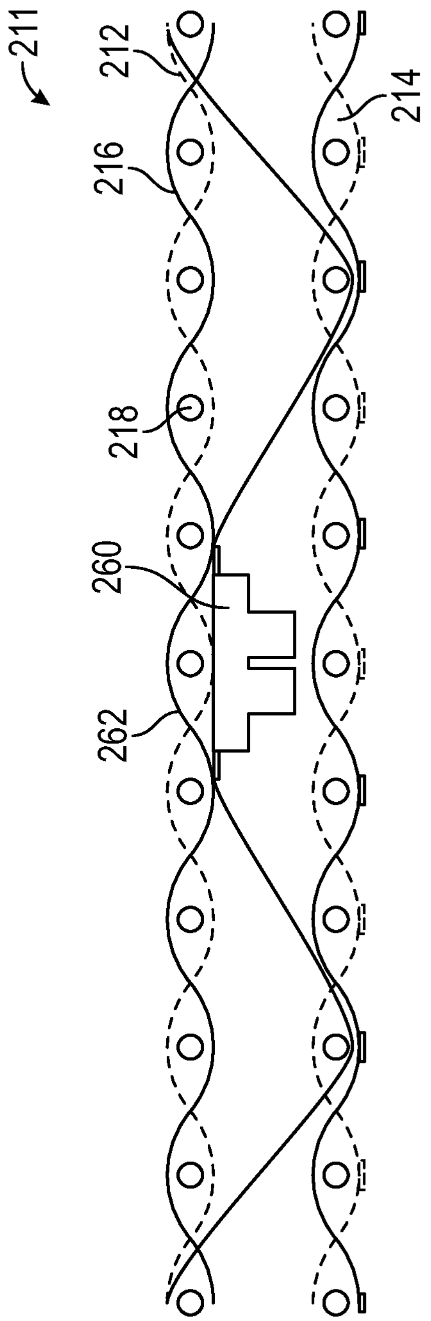
FIG. 8 illustrates a cross-sectional view of the watch band of FIG. 5, in accordance with some embodiments of the present disclosure.

With reference to FIG. 7, one or more light emitting diodes 260 can be coupled to or embedded within the outer layer 214 of the woven threads. In some embodiments, the band body 211 can include reflective material to further increase visibility. With reference to FIG. 8, one or more light emitting diodes 260 can be coupled to or embedded between the inner layer 212 and the outer layer 214 of the woven threads. As can be appreciated, the woven threads of the band body 211 can be provided in an arrangement that at least partially exposes or emits the light from the light emitting diodes 260.

Figure 9:
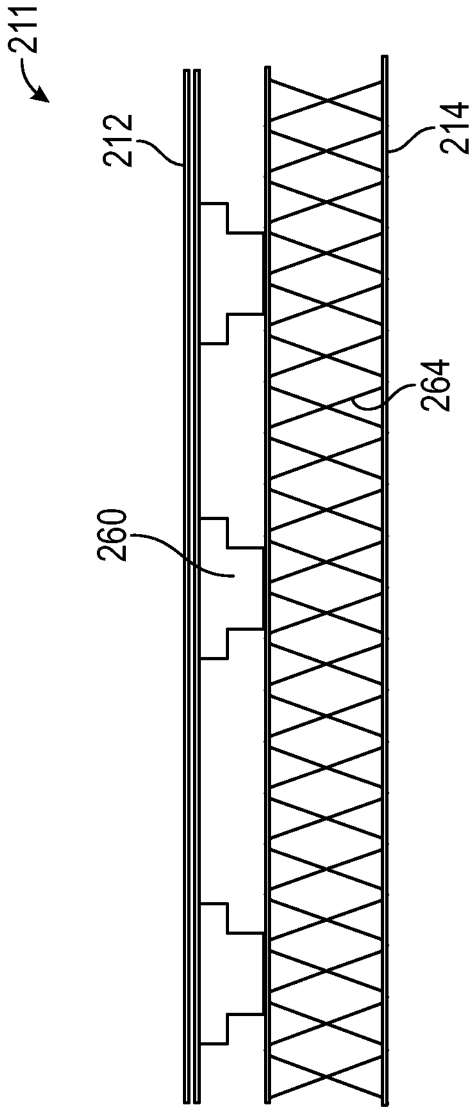
FIG. 9 illustrates a cross-sectional view of the watch band of FIG. 5, in accordance with some embodiments of the present disclosure.

With reference to FIG. 9, the band body 211 can include a light diffuser to distribute or diffuse the light emitted from the light emitting diodes 260. During operation, light from the light emitting diodes 260 can be distributed by a diffuser 264. The diffuser 264 can be formed from a light diffusing fabric. Optionally, the diffuser 264 includes a laminated structure. In some embodiments, the diffuser 264 is a light pipe structure. As can be appreciated, the light emitting diodes 260 can be disposed or embedded within the inner layer 212, the outer layer 214, between the inner layer 212 and the outer layer 214, or within the diffuser 264. Advantageously, by diffusing the light from the light emitting diodes 260, the light can be evenly distributed around the circumference of the watch band 210.

In some embodiments, the watch bands described herein can include sensors to provide additional information or data about the user and/or the user's environment to an external device, such as the watch 10. The sensors may be configured to sense substantially any type of characteristic such as, but not limited to, images, pressure, light, touch, force, temperature, position, motion, and so on. For example, the sensor(s) may be a photodetector, a temperature sensor, a light or optical sensor, an atmospheric pressure sensor, a humidity sensor, a magnet, a gyroscope, an accelerometer, an ultrasonic sensor, a fluid sensor, a microphone, a contact sensor, an ambient light sensor, a touch sensor, and so on.

In some embodiments, the watch bands described herein can include additional radio transmitters, receivers, or antennas that can be used with an external device, such as the watch 10. The radio components can include satellite (GPS) components, tracking components, beacon components, etc.

In some embodiments, the watch bands described herein can include additional charging mechanisms to charge internal batteries and/or batteries of external devices, such as the watch 10. Charging devices can include solar charging components and/or wireless charging components.

Figure 10:
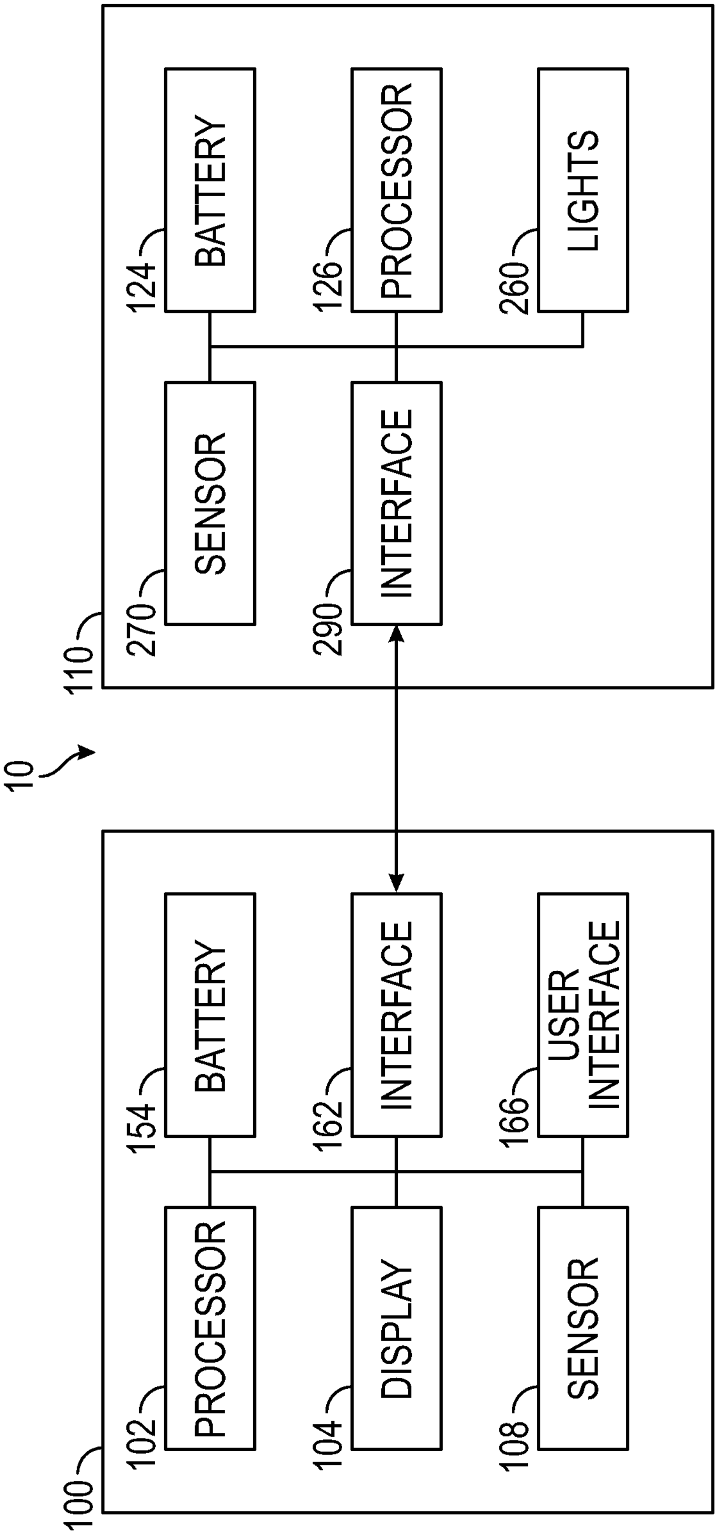
FIG. 10 illustrates a block system diagram of a smart watch and a watch band, in accordance with some embodiments of the present disclosure.

FIG. 10 illustrates a block system diagram of an exemplary watch 10, including a watch body 100 and a watch band 110 (or a watch band 210). The watch 10 described herein may describe the features of a "smart watch". The watch body 100 can include components for interacting with a user, the watch band 110, and/or another device. The watch body 100 can include components that facilitate control of light emitting diodes 260, sensors, and/or other components described herein with respect to watch band 110 and watch band 210.

As shown in FIG. 10, the watch body 100 can include components for interacting with a user. For example, the display 104 may provide an image or video output for the watch body 100. The display 104 may also provide an input surface for one or more input devices such as a touch sensing device, force sensing device, temperature sensing device, and/or a fingerprint sensor. The display 104 may be any size suitable for inclusion at least partially within the housing of the watch body 100 and may be positioned substantially anywhere on the watch body 100. The watch body 100 can further include one or more other user interfaces 166, for receiving input from and/or providing output to a user. For example, one or more buttons, dials, crowns, switches, or other devices can be provided for receiving input from a user. The user interface 166 can include a speaker, a microphone, and/or a haptic device. A haptic device can be implemented as any suitable device configured to provide force feedback, vibratory feedback, tactile sensations, and the like. For example, in one embodiment, the haptic device may be implemented as a linear actuator configured to provide a punctuated haptic feedback, such as a tap or a knock.

As further shown in FIG. 10, the watch body 100 includes one or more processing units 102 that include or are configured to access a memory having instructions stored thereon. The instructions or computer programs may be configured to perform one or more of the operations or functions described with respect to the watch 10. The processing units 102 can be implemented as any electronic device capable of processing, receiving, or transmitting data or instructions. For example, the processing units 102 may include one or more of: a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements. The memory can store electronic data that can be used by the watch body 100. For example, a memory can store electrical data or content such as, for example, audio and video files, documents and applications, device settings and user preferences, timing and control signals or data for the various modules, data structures or databases, and so on. The memory can be configured as any type of memory. By way of example only, the memory can be implemented as random access memory, read-only memory, Flash memory, removable memory, or other types of storage elements, or combinations of such devices.

As further shown in FIG. 10, the watch body 100 may include a battery 154 that is used to store and provide power to the other components of the watch body 100. The battery 154 may be a rechargeable power supply that is configured to provide power to the watch body 100 and/or the watch band 110 while being worn by the user. The watch body 100 may also be configured to recharge the battery 154 using a wireless charging system.

As further shown in FIG. 10, the watch body 100 may include a watch body interface 162 that facilitates transmission of data and/or power to or from other electronic devices across standardized or proprietary protocols. For example, a watch body interface 162 can transmit electronic signals via a wireless and/or wired network connection. Examples of wireless and wired network connections include, but are not limited to, cellular, Wi-Fi, Bluetooth, ultra-wide band (UWB), infrared, RFID, Ethernet, or other suitable communication bands or protocols. The watch body interface 162 can communicate with or sense the watch band 110 via a watch band interface or transmitter 290 of the watch band 110.

As further shown in FIG. 10, the watch body 100 may also include one or more sensors 108 positioned substantially anywhere on the watch body 100. The one or more sensors 108 may be configured to sense substantially any type of characteristic such as, but not limited to, images, pressure, light, touch, force, temperature, position, motion, and so on. For example, the sensors 108 may be a photodetector, a temperature sensor, a light or optical sensor, an atmospheric pressure sensor, a humidity sensor, a magnet, a gyroscope, an accelerometer, and so on. In other examples, the watch body 100 may include one or more health sensors. In some examples, the health sensors can be disposed on a bottom surface of the housing of the watch body 100. The one or more sensors 108 can include optical and/or electronic biometric sensors that may be used to compute one or more health metrics. A sensor 108 can include a light source and a photodetector to form a photoplethysmography (PPG) sensor. The optical (e.g., PPG) sensor or sensors may be used to compute various health metrics including, without limitation, a heart rate, a respiration rate, blood oxygenation level, a blood volume estimate, blood pressure, or a combination thereof. One or more of the sensors 108 may also be configured to perform an electrical measurement using one or more electrodes. The electrical sensor(s) may be used to measure electrocardiographic (ECG) characteristics, galvanic skin resistance, and other electrical properties of the user's body. Additionally or alternatively, a sensor 108 can be configured to measure body temperature, exposure to UV radiation, and other health-related information. As can be appreciated, the sensors 108 can work in conjunction with the sensors 270 within the watch band 110.

As further shown in FIG. 10, the watch band 110 can include a watch band interface or transmitter 290, one or more sensors 270, light emitting diodes 260, a battery or power source 124, and a processor 126, as discussed herein. The light emitting diodes 260 can be activated based on commands generated by the processor 102 and communicated via the watch body interface 162 and the watch band interface or transmitter 290. Alternatively or additionally, the light emitting diodes 260 can operate autonomously without commands generated by any component of the watch body 100.

The sensors 270 can operate to obtain measurements or data about the user or the user's environment. The sensors 270 can perform operations based on commands generated by the processor 102 and communicated via the watch body interface 162 and the watch band interface or transmitter 290. Alternatively or additionally, the sensors 270 can operate autonomously without commands generated by any component of the watch body 100.

As further shown in FIG. 10, the watch band 110 can include one or more processing units 126 that include or are configured to access a memory having instructions stored thereon. The instructions or computer programs may be configured to perform one or more of the operations or functions described with respect to the watch band 110 or specifically the light emitting diodes 260 and/or the sensors 270. The processing units 126 can be implemented as any electronic device capable of processing, receiving, or transmitting data or instructions. For example, the processing units 126 may include one or more of: a microprocessor, a central processing unit (CPU), an application-specific integrated circuit (ASIC), a digital signal processor (DSP), or combinations of such devices. The memory can store electronic data that can be used by the watch band 110. For example, a memory can store electrical data or content such as, for example, audio and video files, documents and applications, device settings and user preferences, timing and control signals or data for the various modules, data structures or databases, and so on. The memory can be configured as any type of memory.

It will be recognized that one, some, or all of the components of the watch body 100 of FIG. 10 can be provided, alternatively or additionally, on and/or within the watch band 110 of the watch 10. For example, a processing unit 102, a display 104, a sensor 108, a battery 154, a watch body interface 162, and/or a user interface 166 can be provide on the watch body 100 and/or the watch band 110. It will be further recognized that one, some, or all of the components of the watch band 110 of FIG. 10 can be provided, alternatively or additionally, on and/or within the watch body 100 of the watch 10. For example, the light emitting diodes 260, sensors 270, and/or a watch band interface or transmitter 290 can be provided on the watch band 110 and/or the watch body 100.

Accordingly, embodiments of the present disclosure provide a watch band for a smart watch can secure the smart watch to the user's wrist. The watch band can include a continuous loop of woven material to conform around the user's wrist. The watch band can further include an encasement formed from a rigid material to receive the smart watch. The encasement can protect the smart watch during activities. The watch band can include a retention portion formed from a transparent material to receive the smart watch. The watch band can also include light emitted diodes to increase visibility. Various examples of aspects of the disclosure are described below as clauses for convenience. These are provided as examples, and do not limit the subject technology.

Clause A: a watch band for use with a smart watch, the watch band comprising: a continuous loop of a woven material configured to conform around a user's wrist; and an encasement coupled to an outer surface of the continuous loop, wherein the encasement is formed from a rigid material, the rigid material being stiffer than the woven material, the encasement defining a pocket between the continuous loop and the encasement, and the pocket is configured to receive the smart watch Clause B: watch band for use with a smart watch, the watch band comprising: a continuous loop of a woven material configured to conform around a user's wrist; and a retention portion coupled to an outer surface of the continuous loop, wherein the retention portion is formed from a transparent material, the retention portion defining a pocket between the continuous loop and the retention portion, and the pocket is configured to receive the smart watch.

Clause C: a watch band for use with a smart watch, the watch band comprising: a band body configured to couple to the smart watch, the band body comprising a woven material configured to conform around a user's wrist; a light emitting diode embedded within the band body, wherein the light emitting diode is configured to emit light through the woven material of the band body; and a flexible conductor extending from the light emitting diode, wherein the flexible conductor is woven into the band body in a warp direction of the band body.

One or more of the above clauses can include one or more of the features described below. It is noted that any of the following clauses may be combined in any combination with each other, and placed into a respective independent clause, e.g., clause A, B, or C.

Clause 1: further comprising a display window defined in the encasement, wherein the display window is configured to permit viewing of a display of the smart watch.

Clause 2: the display window comprises a void to permit access to the display of the smart watch.

Clause 3: the display window comprises a transparent portion.

Clause 4: further comprising a sensor window formed in the continuous loop, wherein the sensor window is adjacent to the pocket and the sensor window is configured to expose one or more sensors of the smart watch.

Clause 5: the rigid material comprises plastic, metal, or glass.

Clause 6: the rigid material is coupled to the outer surface by an adhesive or ultrasonic welding.

Clause 7: the transparent material comprises a monofilament mesh.

Clause 8: the transparent material is woven or knit to the woven material.

Clause 9: the light emitting diode is embedded at an inner surface of the band body Clause 10: the light emitting diode is embedded at an outer surface of the band body.

Clause 11: the light emitting diode is embedded between an inner surface and outer surface of the band body.

Clause 12: the woven material comprises a light diffusing fabric.

Clause 13: the woven material comprises a laminated structure.

Clause 14: further comprising a power source disposed within the band body, wherein the power source is coupled to the light emitting diode by the flexible conductor.

Clause 15: further comprising a controller disposed within the band body, wherein the controller is coupled to the light emitting diode by the flexible conductor.

Clause 16: the controller is operatively coupled to the smart watch.

Various functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "processor", and "memory" all refer to electronic or other technological devices. These terms exclude people or groups of people. For the purposes of the specification, the terms "display" or "displaying" means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device as described herein for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Some of the blocks may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As described above, one aspect of the present technology may include the gathering and use of data available from various sources. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A watch band for use with a smart watch, the watch band comprising:

a band body configured to couple to the smart watch, the band body comprising a woven material configured to conform around a portion of a user's body;

a light emitting diode embedded within opposing layers of the band body that are on opposite sides of the light emitting diode, each of the opposing layers including respective warp threads and respective weft threads woven with the respective warp threads, wherein the light emitting diode is configured to emit light through the woven material of the band body; and a flexible conductor extending from the light emitting diode about sides of the respective weft threads of each of the opposing layers that are opposite the light emitting diode, wherein the flexible conductor is woven into the band body in a warp direction of the band body.

2. The watch band of claim 1, wherein the light emitting diode is embedded at an inner surface of the band body.

3. The watch band of claim 1, wherein the light emitting diode is embedded at an outer surface of the band body.

4. The watch band of claim 1, wherein the light emitting diode is embedded between an inner surface and outer surface of the band body.

5. The watch band of claim 1, wherein the woven material comprises a light diffusing fabric.

6. The watch band of claim 1, wherein the woven material comprises a laminated structure.

7. The watch band of claim 1, further comprising a power source disposed within the band body, wherein the power source is coupled to the light emitting diode by the flexible conductor.

8. The watch band of claim 1, further comprising a controller disposed within the band body, wherein the controller is coupled to the light emitting diode by the flexible conductor.

9. The watch band of claim 8, wherein the controller is operatively coupled to the smart watch.

10. A watch band for use with a smart watch, the watch band comprising:

a band body configured to couple to the smart watch, the band body comprising a woven material configured to conform around a portion of a user's body, the band body comprising an inner layer including inner layer warp threads and inner layer weft threads and an outer layer including outer layer warp threads and outer layer weft threads;

a light emitting diode between the inner layer and the outer layer, wherein the light emitting diode is configured to emit light through the outer layer; and a flexible conductor extending from the light emitting diode, wherein the flexible conductor is woven about sides of the inner layer weft threads opposite the light emitting diode and about sides of the outer layer weft threads opposite the light emitting diode.

11. The watch band of claim 10, wherein the woven material comprises a light diffusing fabric.

12. The watch band of claim 10, wherein the woven material comprises a laminated structure.

13. The watch band of claim 10, further comprising a power source disposed within the band body, wherein the power source is coupled to the light emitting diode by the flexible conductor.

14. The watch band of claim 10, further comprising a controller disposed within the band body, wherein the controller is coupled to the light emitting diode by the flexible conductor.

15. The watch band of claim 14, wherein the controller is operatively coupled to the smart watch.

16. A watch band for use with a smart watch, the watch band comprising:

a band body configured to couple to the smart watch, the band body comprising a woven material configured to conform around a portion of a user's body, the band body comprising an inner layer including inner layer warp threads and inner layer weft threads and an outer layer including outer layer warp threads and outer layer weft threads;

a light emitting diode between the inner layer and the outer layer;

a diffuser between the inner layer and the outer layer, wherein the light emitting diode is configured to emit light through the diffuser and the outer layer; and a flexible conductor extending from the light emitting diode, wherein the flexible conductor is woven about sides of the inner layer weft threads and the outer layer weft threads that face away from each other.

17. The watch band of claim 16, wherein the diffuser is between the outer layer and the light emitting diode.

18. The watch band of claim 16, wherein the light emitting diode is embedded in the band body at an inner surface of the band body.

19. The watch band of claim 16, wherein the woven material comprises a light diffusing fabric.

20. The watch band of claim 16, wherein the woven material comprises a laminated structure.

* * * * *